(12) United States Patent
Sater et al.

(10) Patent No.: US 7,865,689 B2
(45) Date of Patent: *Jan. 4, 2011

(54) PARALLEL INSTALLATION OF LOGICAL PARTITIONS

(75) Inventors: Antoine George Sater, Rochester, MN (US); Fraser Allan Syme, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/163,667

(22) Filed: Jun. 27, 2008

(65) Prior Publication Data

US 2008/0263312 A1    Oct. 23, 2008

Related U.S. Application Data

(63) Continuation of application No. 10/981,065, filed on Nov. 4, 2004, now abandoned.

(51) Int. Cl.
G06F 13/00 (2006.01)

(52) U.S. Cl. ............ 711/173; 711/170; 711/E12.084

(58) Field of Classification Search ............ 711/170, 711/173, 172, E12.087
See application file for complete search history.

(56) References Cited

U.S. PATENT DOCUMENTS

| | | | |
|---|---|---|---|
| 6,094,531 A | 7/2000 | Allison et al. |
| 6,163,805 A | 12/2000 | Silva et al. |
| 7,065,761 B2 | 6/2006 | Foster et al. |
| 2003/0212884 A1 | 11/2003 | Lee et al. |
| 2004/0128351 A1 | 7/2004 | Hoogland et al. |
| 2004/0215948 A1 | 10/2004 | Abbey et al. |

*Primary Examiner*—Mardochee Chery
(74) *Attorney, Agent, or Firm*—Martin & Associates, LLC; Derek P. Martin

(57) ABSTRACT

An apparatus and method provide parallel installation of logical partitions on a computer system. The function of a hardware maintenance console is built into a logical partition configuration mechanism that resides in the system firmware. A virtual local area network (VLAN) is used by the logical partition configuration mechanism to define an I/O bridge that allows installing multiple logical partitions in parallel. Because multiple logical partitions may be installed in parallel, the time required to install logical partitions is greatly reduced.

18 Claims, 8 Drawing Sheets

PARALLEL INSTALLATION OF LOGICAL PARTITIONS

CROSS-REFERENCE TO PARENT APPLICATION

This patent application is a continuation of U.S. Ser. No. 10/981,065 filed on Nov. 4, 2004, which is incorporated herein by reference.

BACKGROUND OF THE INVENTION

1. Technical Field

This invention generally relates to data processing, and more specifically relates to configuration of logically-partitioned computer systems.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning.

When an iSeries computer system is manufactured at IBM, the computer system is typically loaded with a single operating system (e.g., OS/400). Loading a single operating system onto a computer system may be thought of as loading a first logical partition. However, the first operating system is not typically spoken of as residing in a "logical partition" until a second logical partition needs to be defined, which requires the definition of a logical partition that is separate and distinct from the first logical partition that contains the installed operating system.

The loading of an operating system such as OS/400 can take many hours to complete. Once the operating system is loaded, the computer system is typically shipped to a customer. If the customer wants the computer system to be configured with multiple logical partitions, the customer connects the computer system to a separate computer system known as a Hardware Maintenance Console (HMC). The installed operating system on the computer system acts as an I/O bridge. The HMC then interacts with the I/O bridge in the installed operating system to define and load the logical partitions, one at a time in serial fashion. If the customer wants an iSeries computer system with eight different logical partitions, it can take literally days to install these logical partitions in serial fashion one at a time. Without a way to reduce the time required to load multiple logical partitions, the computer industry will continue to suffer from excessively long times to load multiple logical partitions onto a computer system.

DISCLOSURE OF INVENTION

An apparatus and method provide parallel installation of logical partitions on a computer system. The function of a hardware maintenance console is built into a logical partition configuration mechanism that resides in the system firmware. A virtual local area network (VLAN) is used by the logical partition configuration mechanism to define an I/O bridge that allows installing multiple logical partitions in parallel. Because multiple logical partitions may be installed in parallel, the time required to install logical partitions is greatly reduced.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a firmware-based logical partition configuration mechanism allows preloading multiple logical partitions on a computer system in parallel before any operating system is installed. The logical partition configuration mechanism uses a VLAN to assign IP addresses to installable bootable resources (such as hard disk drives) in each logical partition. The different logical partitions may then be installed in parallel by writing data for each logical partition to its appropriate IP address(es) in the logical partition. Because multiple logical partitions may be preloaded in parallel, the time required to preload a computer system with multiple logical partitions is greatly reduced. In addition, the burden of creating the logical partitions is taken from the customer, because the manufacturer can now preload the multiple logical partitions before shipping the computer system to the customer.

Figure 7:
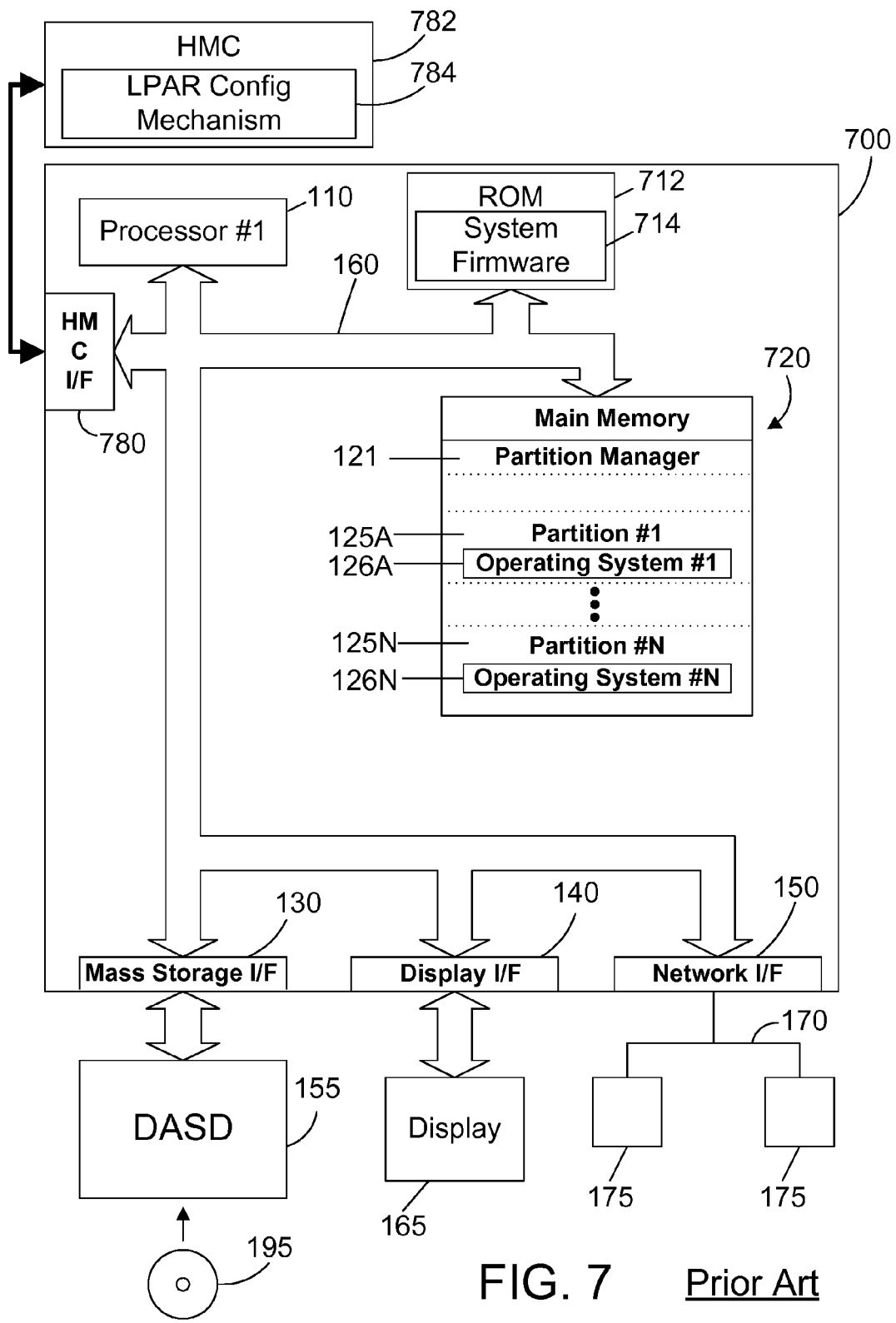
FIG. 7 is a block diagram of a prior art computer apparatus.

In order to understand the present invention, the prior art method of loading multiple logical partitions on a computer system is first presented to provide a context that illustrates the great advantages of the present invention. Referring to FIG. 7, a prior art computer system 700 is an IBM eServer iSeries computer system. As shown in FIG. 7, computer system 700 comprises one or more processors 110, a Read-Only Memory (ROM) 712, a main memory 720, a mass storage interface 130, a display interface 140, a network interface 150, and a hardware maintenance console (HMC) interface 780. These system components are interconnected through the use of a system bus 160. Mass storage interface 130 is used to connect mass storage devices (such as a direct access storage device 155) to computer system 700. One specific type of direct access storage device 155 is a readable and writable CD RW drive, which may store data to and read data from a CD RW 195.

HMC interface 780 preferably connects the computer system 700 to a separate computer system known as a hardware maintenance console (HMC) 782. The HMC 782 includes a logical partition configuration mechanism 784 that is typically used by a customer to configure multiple logical partitions 125A . . . 125N on computer system 700. The HMC 782 is typically used to communicate with an installed operating system in the computer system. The installed operating system provides an I/O bridge that allows installing other logical partitions. Note, however, that the installation of multiple logical partitions using an HMC is done in serial fashion, which means the logical partitions and their respective operating systems are installed one at a time. With operating systems that can take hours to install, it can take literally days to install several logical partitions in serial fashion, as discussed in more detail below.

Figure 1:
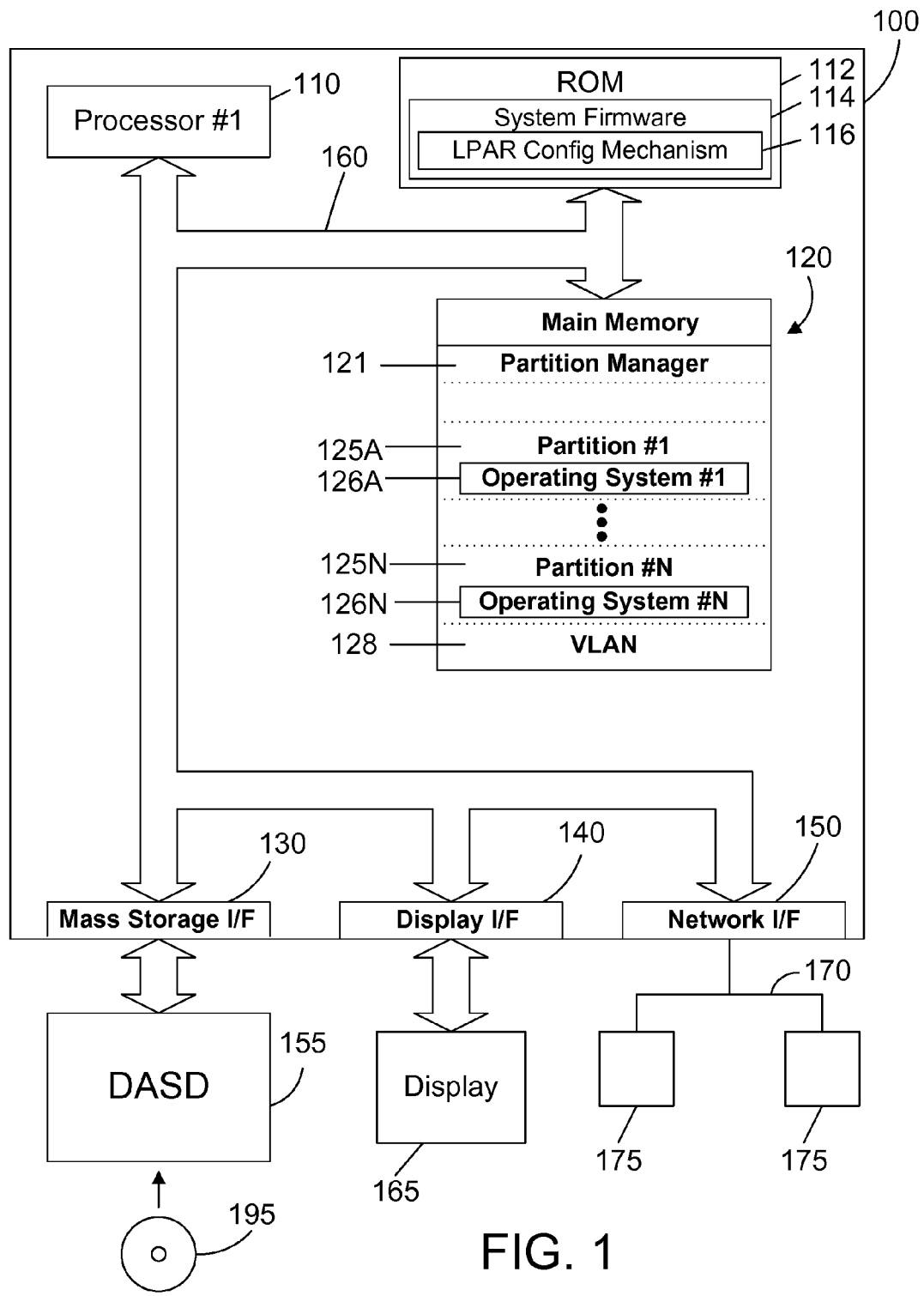
FIG. 1 is a block diagram of a computer system in accordance with the preferred embodiments.

Main memory 720 contains a partition manager 121 and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N. Note that the computer system 700 in FIG. 7 is shown after the installation of multiple logical partitions. The prior art methods for configuring the computer system 700 with its multiple logical partitions is described in more detail below with reference to FIGS. 8-10.

ROM 712 is a read-only memory that contains system firmware 714. When computer system 600 first powers up, the processor 110 executes the system firmware 714 in ROM 712. The system firmware tells the processor 110 the configuration of the computer system 700. System firmware 714 is also known in the art as system microcode or Binary Input Output System (BIOS), and is the code that is initially executed when a computer boots up at power up or after a reset.

Display interface 140 is used to directly connect one or more displays 165 to computer system 700. These displays 165, which may be non-intelligent (i.e., dumb) terminals or fully programmable workstations, are used to allow system administrators and users to communicate with computer system 700.

Network interface 150 is used to connect other computer systems and/or workstations (e.g., 175 in FIG. 1) to computer system 700 across a network 170 using a suitable network protocol, such as TCP/IP (Transmission Control Protocol/Internet Protocol).

Figure 8:
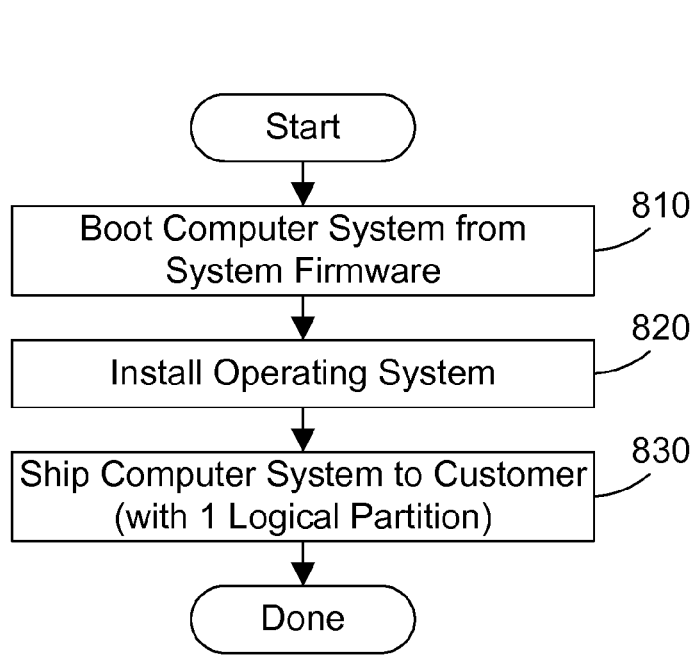
FIG. 8 is a flow diagram of a prior art method for loading the computer system of FIG. 7 with an operating system.

Referring to FIG. 8, a prior art method 800 shows steps a manufacturer takes to preload an operating system on computer system 700 in FIG. 7. First, the computer system is booted from the system firmware (step 810). Next, an operating system is installed (step 820). In FIG. 7, we assume for the sake of illustration that the first operating system installed is operating system #1 126A. Once the operating system 126A is installed, the computer system is shipped to the customer (step 830). The single installed operating system in the computer system may be thought of as residing in a default logical partition. However, computer systems that have a single logical partition typically do not have a partition manager 121, and are not considered to have any logical partitions, because the existence of two logical partitions is required before a computer system can be said to be "logically partitioned".

Figure 9:
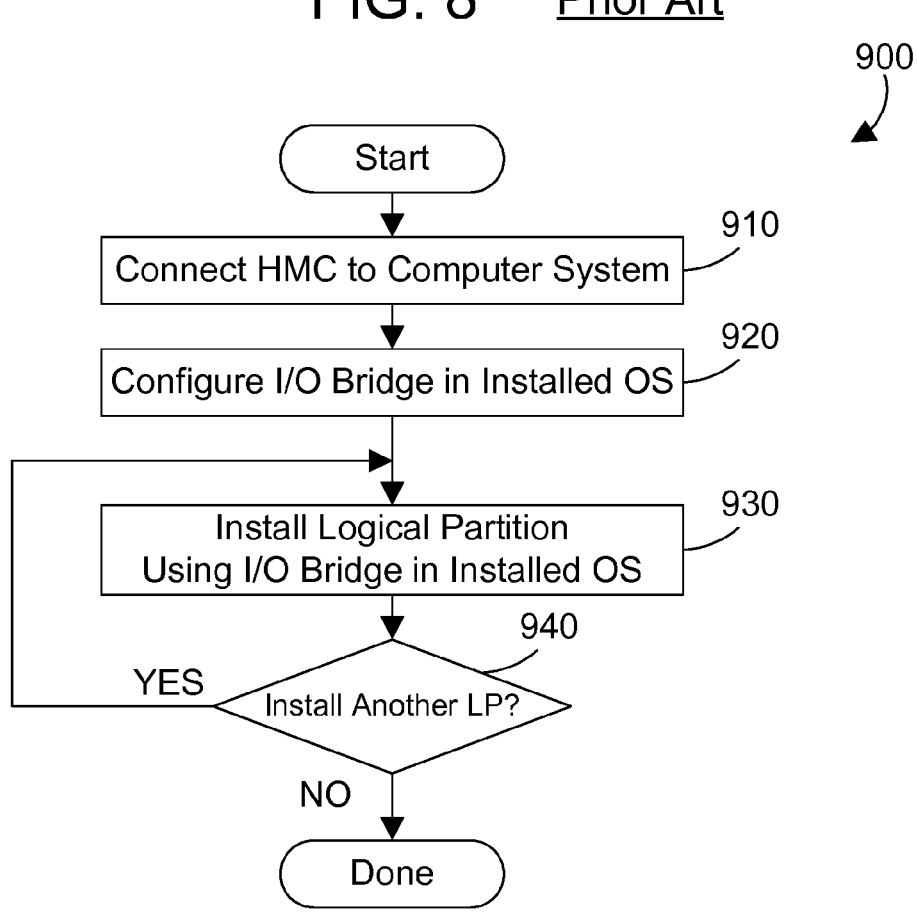
FIG. 9 is a flow diagram of a prior art method for a customer to install logical partitions on the computer system of FIG. 7.

Once the customer receives the computer system 700 with a single operating system installed, the customer may then load multiple logical partitions on the computer system, as shown in method 900 in FIG. 9. First, the customer connects a hardware maintenance console (HMC) to the computer system (step 910). An I/O bridge is then configured in the installed operating system (step 920). Once the bridge is configured, a logical partition may be installed using the I/O bridge (step 930). Once the installation of the logical partition is complete, if there is another logical partition to install (step 940=YES), method 900 loops back to step 930 and continues. Once all logical partitions have been installed (step 940=NO), method 900 is done. Note that steps 930 and 940 illustrate the serial nature of installing multiple logical partitions. These multiple logical partitions are installed one at a time. If it takes 6 hours to install a logical partition that runs OS/400, and the customer needs to define 8 logical partitions on the computer system, it will literally take over 48 hours to install the 8 logical partitions on the computer system. This amount of time is excessive and imposes substantial burden on customers, which could be relieved if the logical partitions could be efficiently preloaded by the manufacturer before shipping the computer system to the customer.

Figure 10:
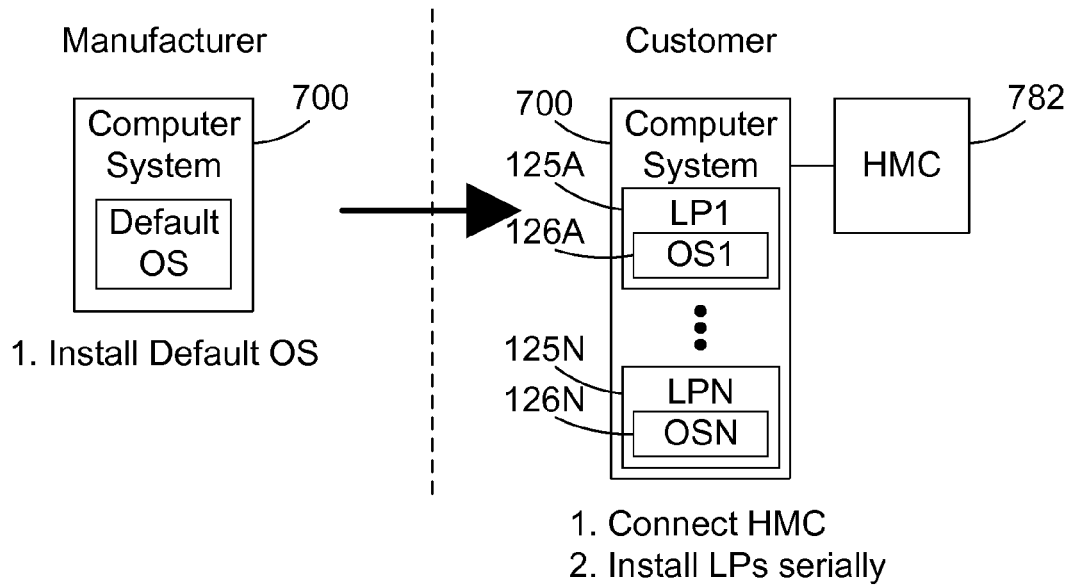
FIG. 10 is a prior art block diagram showing a two-step process for installing multiple logical partitions on a computer system.

FIG. 10 shows a block diagram that illustrates the two-step prior art process of configuring a computer system with multiple logical partitions. The manufacturer preloads a single operating system onto computer system 700. The computer system 700 is then shipped to the customer, which connects the computer system 700 to an HMC 782. The customer then serially loads logical partitions, one at a time, onto the computer system 700. The computer system 700 shown in FIG. 7 represents a computer system after the customer has used the HMC 782 to define all the desired logical partitions 125A . . . 125N.

Figure 11:
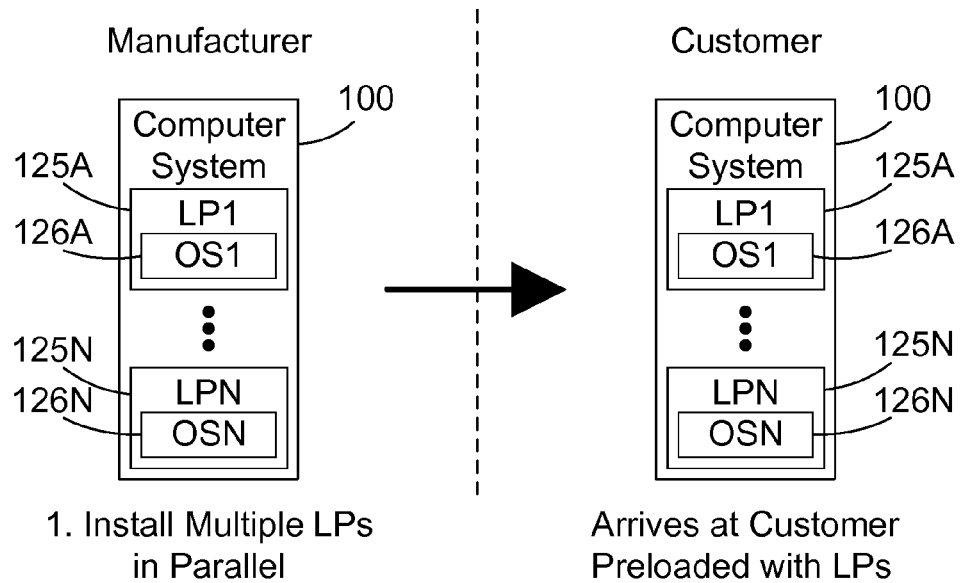
FIG. 11 is a block diagram showing a single-step process for installing in parallel multiple logical partitions in accordance with the preferred embodiments.

We now consider the improvement that is provided by the firmware-based preload of logical partitions in accordance with the preferred embodiments. Referring to FIG. 11, the manufacturer may now install (or preload) multiple logical partitions in parallel. Thus, in the simple example above that has 8 logical partitions to install that each take 6 hours to install, the preferred embodiments allow installing all 8 logical partitions in parallel, resulting in an installation time that is significantly less than the 48 hours required in the prior art. Not only is the install time greatly reduced, but the logical partitions may now be preloaded by the manufacturer, relieving the customer of the time and hassle of configuring the logical partitions after receiving a computer system from the manufacturer.

Referring to FIG. 1, a computer system 100 is an enhanced IBM eServer iSeries computer system, and represents one suitable type of computer system that supports logical partitioning in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a Read-Only Memory (ROM) 112, a main memory 120, a mass storage interface 130, a display interface 140, and a network interface 150. Note that one or more of mass storage interface 130, display interface 140, and network interface 150 could be embedded I/O on computer system 100. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195.

Main memory 120 contains a partition manager 121, N logical partitions 125, shown in FIG. 1 as logical partitions 125A through 125N, and a virtual local area network (VLAN) 128. Partition manager 121 preferably creates these N logical partitions 125. Each logical partition 125 preferably includes a corresponding operating system 126, shown in FIG. 1 as operating systems 126A through 126N. VLAN 128 is used by the LPAR config mechanism 116 in the system firmware 114 to perform multiple parallel installations of logical partitions 125 in computer system 100.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, ROM 112, main memory 120, mass storage interface 130, display interface 140, network interface 150, and system bus 160. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone or language). The operating systems in the logical partitions could even be different than OS/400, provided it is compatible with the hardware (such as AIX or Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O. Thus, one partition could be defined to include two processors and a portion of memory 120, along with one or more embedded I/O that can provide the functions of mass storage interface 130, display interface 140, network interface 150, or interfaces to I/O adapters or other devices. Another partition could then be defined to include three other processors, a different portion of memory 120, and one or more embedded I/O. The partitions are shown in FIG. 1 to symbolically represent logical partitions, which would include system resources outside of memory 120 within computer system 100. Note also that the partition manager 121 preferably resides in memory and hardware separate from the logical partitions and includes facilities and mechanisms that are not directly available to the logical partitions. In the preferred implementation, the partition manager 121 is preferably part of an operating system 126 instead of being separate code. Thus, once an operating system 126 is installed, the partition manager is available for use.

ROM 112 includes system firmware 114 which includes a logical partition configuration mechanism (LPAR Config Mechanism) 116. The LPAR config mechanism 116 provides the functionality of the hardware maintenance console 782 in the prior art (FIG. 7) within the computer system 100 itself. As a result, the HMC interface 780 shown in FIG. 7 is not needed in computer system 100 in FIG. 1.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and VLAN 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions in the system firmware 114, which initializes the operating systems in the logical partitions.

Although computer system 100 is shown to contain only a single processor and a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
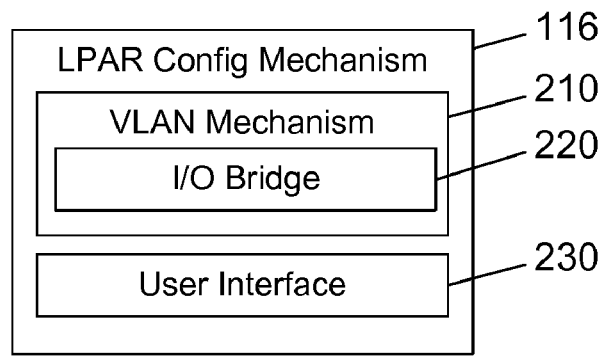
FIG. 2 is a block diagram showing components within the LPAR configuration mechanism shown in FIG. 1.

Referring now to FIG. 2, the LPAR config mechanism 116 of FIG. 1 is shown to include a virtual local area network (VLAN) mechanism 210 and a user interface 230. The VLAN mechanism 210 preferably configures the VLAN 128 in memory 120, and defines an I/O bridge 220 that may be used to install in parallel multiple logical partitions. The user interface 230 provides a tool that accepts user input to define which resources are allocated to which logical partition, and to define a map of IP addresses to installable bootable resources in the logical partitions.

Figure 3:
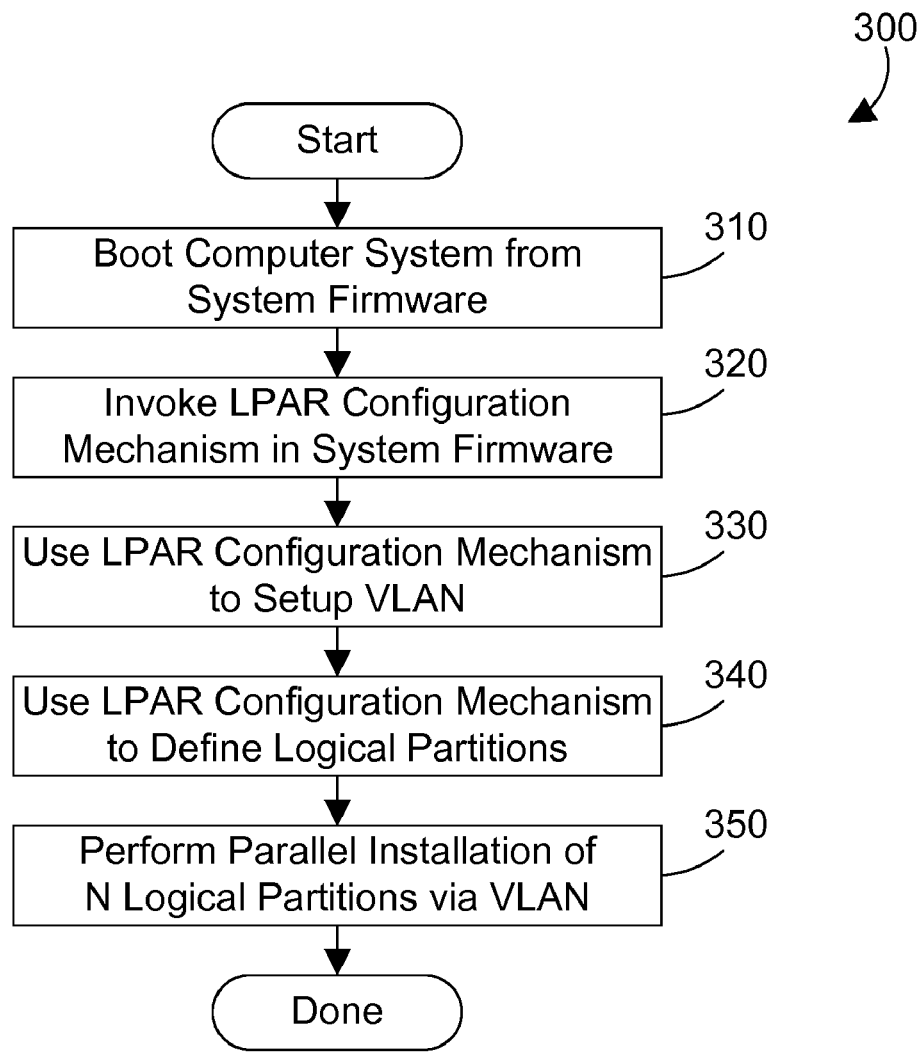
FIG. 3 is a flow diagram of a method for firmware-based preloading of multiple logical partitions in accordance with the preferred embodiments.

Method 300 in FIG. 3 illustrates one specific method for firmware-based installation of logical partitions in accordance with the preferred embodiments. First, the computer system is booted from system firmware (step 310). The LPAR config mechanism 116 in the system firmware is then invoked (step 320). The LPAR config mechanism 116 is used to setup the VLAN (step 330). The logical partitions are then defined using the LPAR config mechanism (step 340). Note that steps 330 and 340 are typically performed by a user using the user interface 230 to LPAR config mechanism 114 in FIG. 2. Once the VLAN is setup (step 330) and the logical partitions are defined (step 340), the logical partitions are installed in parallel via the VLAN (step 350). The advantages of method 300 are many. First, the LPAR config mechanism 116 resides in the system firmware, which means that multiple logical partitions may be installed in parallel even before any operating system is loaded onto the system. The prior art requires installing a first operating system, which acts as an I/O bridge for creating subsequent logical partitions. Because the LPAR config mechanism 116 resides within the computer system 100, there is no need for an external HMC, and thus the HMC interface is no longer needed. In addition, the manufacturer may now efficiently preload multiple logical partitions, relieving the customer from the burden of installing the logical partitions after receiving the computer system from the manufacturer. These many advantages provide significant cost savings over the prior art that provide a competitive advantage in the marketplace.

Figure 4:
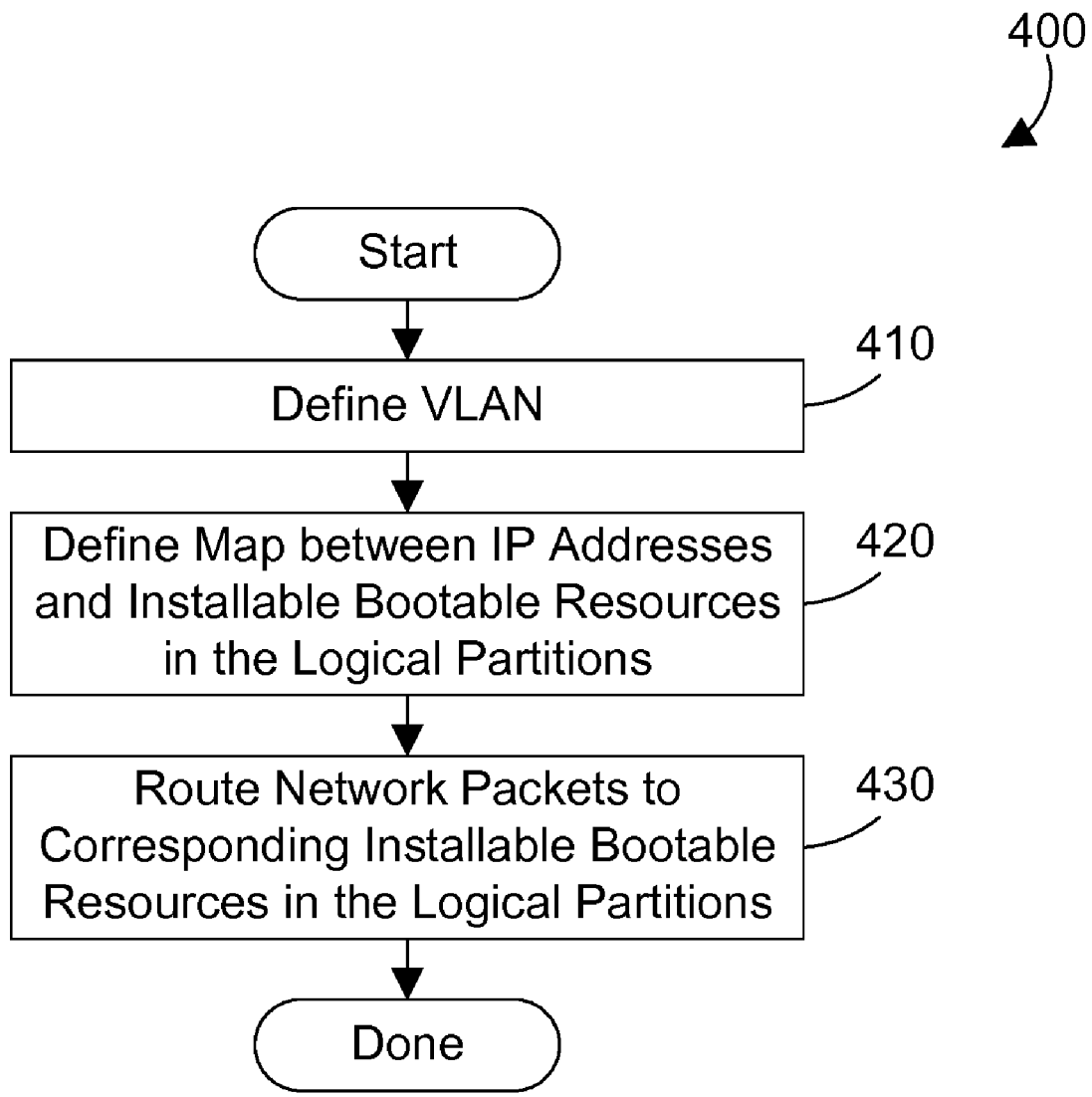
FIG. 4 is a block diagram of a method for using a VLAN to perform parallel installation of multiple logical partitions.

Referring to FIG. 4, a method 400 in accordance with the preferred embodiments begins by defining the VLAN (step 410). Next, a map of IP addresses is provided for the installable bootable resources in the logical partitions (step 420). Network packets are then routed to the corresponding installable bootable resources in the logical partitions (step 430). Because packets destined for different logical partitions may be sent in any random order, method 400 results in the parallel installation of multiple logical partitions. To correlate the steps in method 400 of FIG. 4 to the steps in method 300 in FIG. 3, steps 410 and 420 in method 400 are preferably performed by step 330 in method 300, and step 430 in method 400 is preferably performed by step 350 in method 300.

Figure 5:
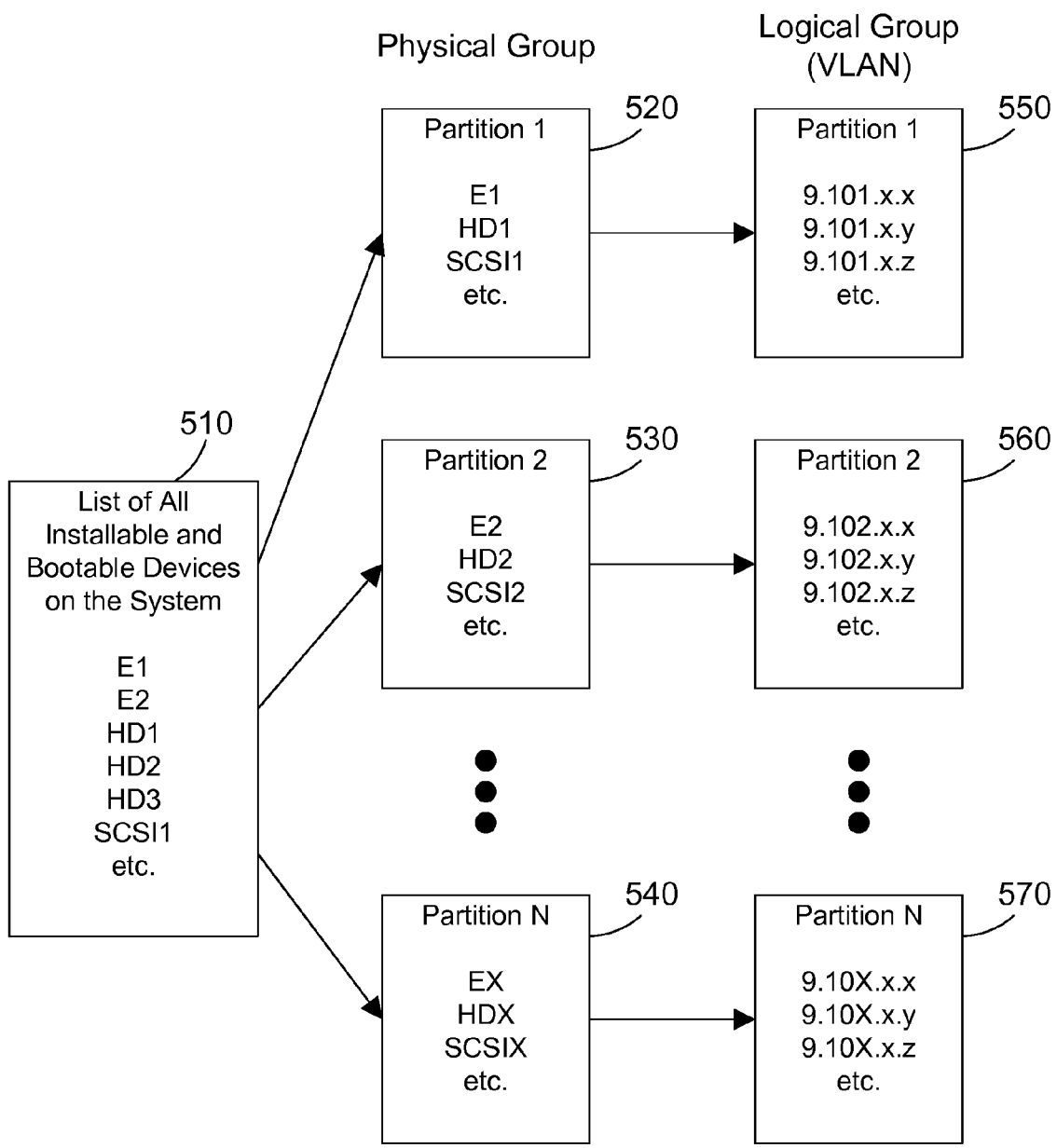
FIG. 5 is a block diagram showing the division of resources on a computer system into multiple logical partitions and the mapping of those resources to corresponding IP addresses in the VLAN in accordance with the preferred embodiments.

Referring now to FIG. 5, a block diagram is shown to illustrate the creation of multiple logical partitions within the scope of the preferred embodiments. First, a list of all installable and bootable resources on the system is displayed, as shown in box 510 in FIG. 5. Box 510 shows Ethernet devices E1 and E2, hard disk drives HD1, HD2, and HD3, SCSI interface SCSI1, etc. The display of devices to the user is via the user interface 230 in FIG. 2. The user can then select which bootable devices are assigned to which logical partitions, as shown in boxes 520, 530 and 540. For this simple example, we assume that a single Ethernet device E1, hard drive, and SCSI interface are assigned to each logical partition, with other resources that are not shown in FIG. 5. Once these devices have been assigned to a logical partition, the devices are then mapped to specific IP addresses in the VLAN, as shown in boxes 550, 560 and 570. Each installable and bootable resource in each logical partition is assigned a corresponding IP address. This is what allows multiple parallel installations. Packets destined for different logical partitions may be intermixed, because the IP address of their destination is known to correlate to the desired logical partition for the packet.

Figure 6:
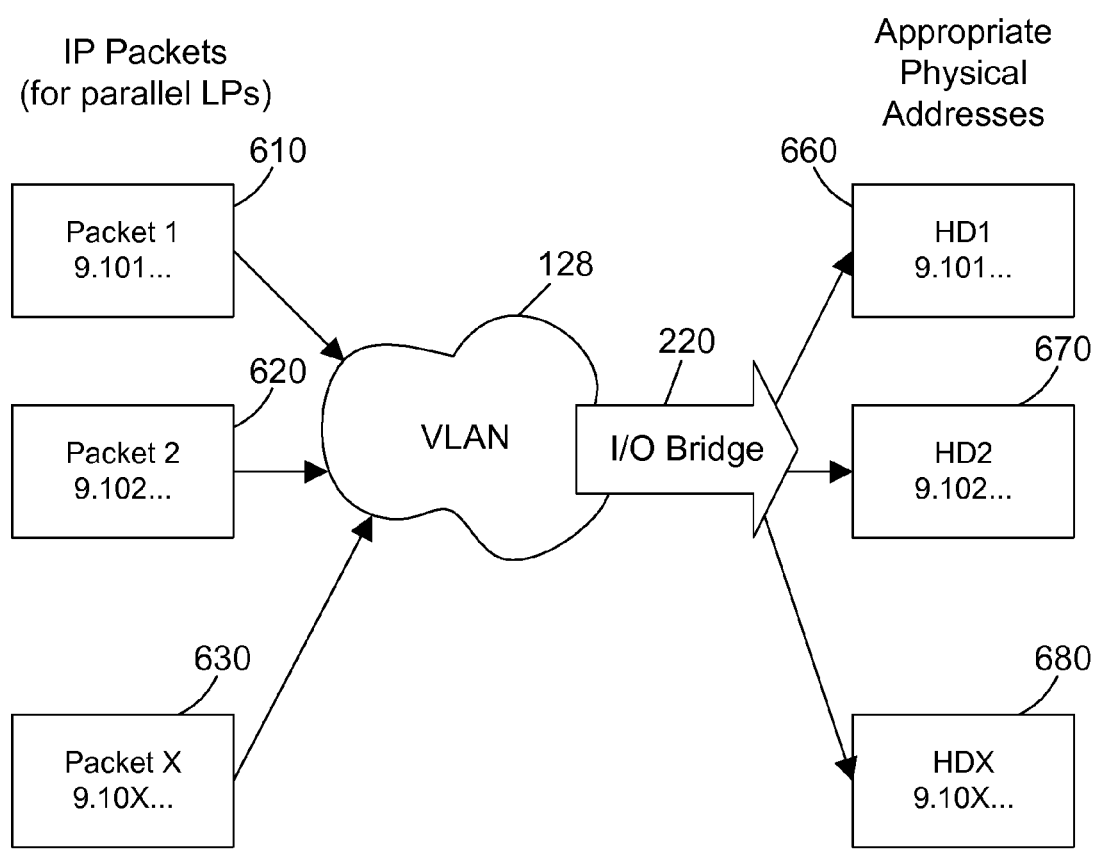
FIG. 6 is a block diagram showing the use of the VLAN to write multiple packets that target different logical partitions to the appropriate logical partitions in accordance with the preferred embodiments.

Referring to FIG. 6, a block diagram shows the dynamic routing of packets to their respective destinations via VLAN 128, which provides the capability of installing multiple logical partitions at the same time. Each packet 610, 620, 630 has a destination IP address. This mapping of IP addresses to logical partitions was done via the user interface 230 in the LPAR config mechanism 116, as shown in FIG. 5. Each packet is sent via the VLAN 128. These packets are routed via the I/O bridge 220 to the appropriate physical addresses 660, 670 and 680. The VLAN 128 thus allows multiple logical partitions to be installed in parallel without requiring that an operating system is first present and running on the computer system.

The preferred embodiments provide a significant advance in the art by embedding the function of a logical partition configuration mechanism into the system firmware. The firmware-based logical partition configuration mechanism allows multiple logical partitions to be defined before any operating system is installed on the computer system. The multiple logical partitions may then be installed in parallel, saving significant time and resources. In addition, the multiple logical partitions may be efficiently installed by the manufacturer instead of imposing this burden on the customer.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the invention has been discussed herein with reference to a manufacturer performing parallel preloads of multiple logical partitions on a computer system, the preferred embodiments expressly extend to a logical partition configuration mechanism that is capable of configuring multiple logical partitions in parallel at the customer or end-user level as well.

The invention claimed is:

1. An apparatus comprising:
   at least one processor;
   a memory coupled to the at least one processor; and
   a logical partition configuration mechanism residing in the memory and executed by the at least one processor, the logical partition configuration mechanism installing in parallel a plurality of logical partitions on the apparatus, the logical partition configuration mechanism comprising;
      a user interface that is used by a user to define the plurality of logical partitions by the user defining a map between a plurality of installable bootable resources in each logical partition and corresponding Internet Protocol (IP) addresses; and
      a virtual local area network (VLAN) mechanism that comprises an I/O bridge that is used to route a plurality of network packets to corresponding installable bootable resources within the plurality of logical partitions.

2. The apparatus of claim 1 wherein the logical partition configuration mechanism resides in system firmware in the memory.

3. The apparatus of claim 1 wherein the logical partition configuration mechanism begins installation in parallel of the plurality of logical partitions on the apparatus before installing any operating system on the apparatus.

4. The apparatus of claim 1 wherein the memory comprises Read-Only Memory (ROM).

5. The apparatus of claim 1 wherein the installing in parallel a plurality of logical partitions on the apparatus comprises the steps of defining each logical partition and installing an operating system in each logical partition.

6. An apparatus comprising:
at least one processor;
a read-only memory coupled to the at least one processor;
system firmware residing in the read-only memory, the system firmware including a logical partition configuration mechanism that installs in parallel a plurality of logical partitions on the apparatus, wherein the logical partition configuration mechanism begins installation in parallel of the plurality of logical partitions on the apparatus before any operating system is installed on the apparatus, wherein the logical partition configuration mechanism comprises:
a virtual local area network (VLAN) mechanism that comprises an I/O bridge that is used to route a plurality of network packets to corresponding installable bootable resources within the plurality of logical partitions; and
a user interface that allows a user to define the plurality of logical partitions and to define a mapping between the installable bootable resources in each logical partition and corresponding Internet Protocol (IP) addresses in the VLAN.

7. A computer readable program product comprising a computer program residing on recordable media, the computer program comprising:
a logical partition configuration mechanism that installs in parallel a plurality of logical partitions on a computer apparatus, the logical partition configuration mechanism comprising:
a user interface that is used by a user to define the plurality of logical partitions by the user defining a map between a plurality of installable bootable resources in each logical partition and corresponding Internet Protocol (IP) addresses; and
a virtual local area network (VLAN) mechanism that comprises an I/O bridge that is used to route a plurality of network packets to corresponding installable bootable resources within the plurality of logical partitions.

8. The program product of claim 7 wherein the logical partition configuration mechanism resides in system firmware.

9. The program product of claim 7 wherein the logical partition configuration mechanism begins installation in parallel of the plurality of logical partitions on the apparatus before installing any operating system on the apparatus.

10. The program product of claim 7 wherein the installing in parallel the plurality of logical partitions on the apparatus comprises the steps of defining each logical partition and installing an operating system in each logical partition.

11. A computer readable program product comprising system firmware residing on recordable media, the system firmware comprising:
a logical partition configuration mechanism that installs in parallel a plurality of logical partitions on a computer apparatus, wherein the logical partition configuration mechanism begins installation in parallel of the plurality of logical partitions on the computer apparatus before any operating system is installed on the computer apparatus, wherein the logical partition configuration mechanism comprises:
a virtual local area network (VLAN) mechanism that comprises an I/O bridge that is used to route a plurality of network packets to corresponding installable bootable resources within the plurality of logical partitions; and
a user interface that allows a user to define the plurality of logical partitions and to define a mapping between the installable bootable resources in each logical partition and corresponding Internet Protocol (IP) addresses in the VLAN.

12. A computer-implemented method for installing a plurality of logical partitions on a computer apparatus, the method comprising the steps of:
(A) invoking a logical partition configuration mechanism to define the plurality of logical partitions by performing the steps of:
a user defining the plurality of logical partitions; and
the user defining a map between a plurality of installable bootable resources in each logical partition and corresponding Internet Protocol (IP) addresses for each of the plurality of installable bootable resources; and
(B) installing in parallel the plurality of logical partitions by performing the stops of:
defining a virtual local area network (VLAN);
defining a map between the plurality of installable bootable resources in each logical partition and corresponding Internet Protocol (IP) addresses in the VLAN; and
the VLAN routing a plurality of network packets to corresponding installable bootable resources within the plurality of logical partitions.

13. The method of claim 12 wherein steps (A) and (B) are performed before installing any operating system on the computer apparatus.

14. The method of claim 12 wherein steps (A) and (B) are performed by code that resides in system firmware in the computer apparatus.

15. The method of claim 12 wherein the installing in parallel the plurality of logical partitions comprises the steps of defining each logical partition and installing an operating system in each logical partition.

16. A computer-implemented method for installing a plurality of logical partitions on a computer apparatus, the method comprising the steps of:
(A) a user invoking a firmware-based logical partition configuration mechanism to define the plurality of logical partitions before installation of any operating system on the computer apparatus, wherein the defining of the plurality of logical partitions comprises the steps of:
(A1) a user defining the plurality of logical partitions by selecting at least one installable bootable resource for each logical partition from a list of installable bootable resources on the computer apparatus; and
(A2) the user defining a map between installable bootable resources in each logical partition and corresponding Internet Protocol (IP) addresses;
(B) defining a virtual local area network (VLAN); and
(C) the VLAN routing a plurality of network packets to corresponding installable bootable resources within the plurality of logical partitions.

17. A method for deploying computing infrastructure, comprising the steps of:
invoking a logical partition configuration mechanism to define a plurality of logical partitions on a computer apparatus by performing the steps of:
a user defining the plurality of logical partitions; and the user defining a map between a plurality of installable bootable resources in each logical partition and corresponding Internet Protocol (IP) addresses for each of the plurality of installable bootable resources; and
installing in parallel the plurality of logical partitions by performing the steps of:
defining a virtual local area network (VLAN);
defining a map between the plurality of installable bootable resources in each logical partition and corresponding Internet Protocol (IP) addresses in the VLAN; and
the VLAN routing a plurality of network packets to corresponding installable bootable resources within the plurality of logical partitions.

18. The method of claim 17 further comprising the steps of:
receiving a purchase request for the computer apparatus, the purchase request comprising specifications for the plurality of logical partitions; and
configuring the logical partitions responsive to the purchase request.

* * * * *